(12) United States Patent
Johnson

(10) Patent No.: US 9,964,660 B2
(45) Date of Patent: May 8, 2018

(54) ELECTROMAGNETIC TELEMETRY APPARATUS AND METHODS FOR USE IN WELLBORES

(71) Applicant: Michael H. Johnson, Katy, TX (US)

(72) Inventor: Michael H. Johnson, Katy, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 66 days.

(21) Appl. No.: 13/941,728

(22) Filed: Jul. 15, 2013

(65) Prior Publication Data

US 2015/0015411 A1 Jan. 15, 2015

(51) Int. Cl.
| | |
|---|---|
| *E21B 47/12* | (2012.01) |
| *G01V 3/34* | (2006.01) |
| *E21B 17/02* | (2006.01) |
| *F16L 25/01* | (2006.01) |

(52) U.S. Cl.
CPC .............. *G01V 3/34* (2013.01); *E21B 47/122* (2013.01); *E21B 17/028* (2013.01); *F16L 25/01* (2013.01)

(58) Field of Classification Search
CPC ...... E21B 47/122; E21B 17/028; F16L 25/01; G01V 3/20
USPC .............. 324/338, 339, 342, 355; 340/853.7, 340/854.3, 854.8; 367/82
See application file for complete search history.

(56) References Cited

U.S. PATENT DOCUMENTS

| | | | | |
|---|---|---|---|---|
| 3,719,230 | A | * | 3/1973 | Kemp et al. ................... 166/376 |
| 4,578,675 | A | * | 3/1986 | MacLeod ................... 340/853.7 |
| 4,839,644 | A | * | 6/1989 | Safinya et al. ............. 340/854.3 |
| 5,339,037 | A | * | 8/1994 | Bonner et al. ................. 324/366 |
| 5,745,047 | A | | 4/1998 | Van Gisbergen et al. |
| 6,160,492 | A | | 12/2000 | Herman |
| 6,184,685 | B1 | | 2/2001 | Paulk et al. |
| 6,515,592 | B1 | | 2/2003 | Babour et al. |
| 6,678,616 | B1 | | 1/2004 | Winkler et al. |
| 7,227,363 | B2 | * | 6/2007 | Gianzero et al. ............. 324/342 |
| 7,436,183 | B2 | * | 10/2008 | Clark ............................ 324/338 |
| 7,554,458 | B2 | | 6/2009 | Hudson et al. |
| 7,692,428 | B2 | | 4/2010 | Clark et al. |
| 7,806,180 | B2 | | 10/2010 | Hudson |

(Continued)

FOREIGN PATENT DOCUMENTS

CN 101054898 B 7/2011

OTHER PUBLICATIONS

PCT International Search Report and Written Opinion; International Application No. PCT/US2014/04523; International Filing Date: Jun. 16, 2014; Date of Mailing: Oct. 21, 2014; pp. 1-12.

(Continued)

*Primary Examiner* — Benyam Haile
(74) *Attorney, Agent, or Firm* — Cantor Colburn LLP

(57) ABSTRACT

In one aspect, an apparatus for use in a wellbore is disclosed that in one embodiment includes an electrically-conductive member having an outer and/or inner surface coated with an electrically-insulating material, a transmitter placed at a first location on the electrically-conductive member that induces electromagnetic wave signals that travel along the coated surface of the electrically conductive member, and a receiver placed at a second location spaced from the first location on the electrically-conductive member that detects the electromagnetic induced by the transmitter.

17 Claims, 5 Drawing Sheets

(56) References Cited

U.S. PATENT DOCUMENTS

| | | |
|---|---|---|
| 7,960,969 B2 | 6/2011 | Mouget et al. |
| 8,122,958 B2 * | 2/2012 | Vestavik ................. 166/277 |
| 8,330,463 B2 | 12/2012 | Blanz |
| 2002/0101242 A1 | 8/2002 | Bittar |
| 2003/0098157 A1 | 5/2003 | Hales et al. |
| 2003/0178205 A1 | 9/2003 | Henderson |
| 2004/0263414 A1 | 12/2004 | Chen |
| 2005/0218898 A1 | 10/2005 | Fredette et al. |
| 2006/0044155 A1 | 3/2006 | Le Briere et al. |
| 2006/0202806 A1 | 9/2006 | Bonner et al. |
| 2007/0137854 A1 * | 6/2007 | Homan ............... G01V 3/28 166/66 |
| 2008/0030415 A1 | 2/2008 | Homan et al. |
| 2008/0290873 A1 | 11/2008 | Homan et al. |
| 2009/0038793 A1 | 2/2009 | Schmitt et al. |
| 2009/0091327 A1 | 4/2009 | Blanz |
| 2009/0160449 A1 | 6/2009 | Martinez et al. |
| 2009/0166023 A1 | 7/2009 | Svenning et al. |
| 2009/0302847 A1 | 12/2009 | Knizhnik |
| 2010/0013663 A1 | 1/2010 | Cavender et al. |
| 2010/0327681 A1 | 12/2010 | Perry |
| 2011/0304474 A1 * | 12/2011 | Salamitou et al. ........ 340/854.6 |
| 2012/0094701 A1 | 4/2012 | Jensen et al. |

OTHER PUBLICATIONS

PCT International Search Report and Written Opinion; International Application No. PCT/US2013/066274; International Filing Date: Oct. 23, 2013; dated Feb. 17, 2014; pp. 1-9.

\* cited by examiner

ELECTROMAGNETIC TELEMETRY APPARATUS AND METHODS FOR USE IN WELLBORES

BACKGROUND

1. Field of the Disclosure

This disclosure relates generally to wireless electromagnetic telemetry for use in wellbore operations.

2. Background of the Art

Wellbores are drilled in subsurface formations for the production of hydrocarbons (oil and gas). Modem wells can extend to great depths, often more than 1500 meters (or 15,000 ft.). Various methods have been used for communicating information from the surface to devices in the wellbore, both for production wells and during drilling of wells. In production wells, hard wired, acoustic and electromagnetic telemetry methods have been proposed. During drilling, the predominant telemetry method is mud pulse telemetry wherein information from the surface and/or downhole is transmitted through via mud pulses created in the mud flowing mud through drill string. The mud pulse telemetry is extremely slow, such as a few bits per minute. The acoustic and electromagnetic telemetry systems have not been very reliable and successful. Hard wiring can be problematic due to the harsh down-hole environment and is also very expensive. There is a need for a more reliable telemetry system for use in well operations.

The present disclosure provides an electromagnetic telemetry system and methods that addresses some of the above-noted issues.

SUMMARY

In one aspect, an apparatus for use in a wellbore is disclosed that in one embodiment includes an electrically-conductive member having an outer and/or inner surface coated with an electrically-insulating material, a transmitter placed at a first location on the electrically-conductive member that induces electromagnetic ("EM") wave signals that travel along the coated surface of the electrically conductive member, and a receiver placed at a second location spaced from the first location on the electrically-conductive member that detects the electromagnetic induced by the transmitter.

In another aspect, a method of transmitting data along an electrically-conductive member in a wellbore is disclosed, which method in one embodiment may include: providing an electrically-conductive tubular in the wellbore, wherein the tubular is coated on one of an outer surface and an inner surface of the tubular; transmitting electromagnetic wave signals representing data along one of the outer surface and inner surface of the tubular using a transmitter disposed at a first location on the tubular; receiving the electromagnetic wave signals traveling along one of the outer surface and inner surface of the tubular responsive to the transmitted electromagnetic wave signals using a receiver disposed on at a second distal location on the tubular; and determining the data from the received electromagnetic wave signals.

Examples of the more important features of a system and method for monitoring a physical condition of a production well equipment and controlling well production have been summarized rather broadly in order that the detailed description thereof that follows may be better understood, and in order that the contributions to the art may be appreciated. There are, of course, additional features that will be described hereinafter and which will form the subject of the claims.

BRIEF DESCRIPTION OF THE DRAWINGS

For a detailed understanding of the apparatus and methods disclosed herein, reference should be made to the accompanying drawings and the detailed description thereof, wherein like elements generally have been given like numerals, and wherein.

DETAILED DESCRIPTION OF THE DRAWINGS

Figure 1:
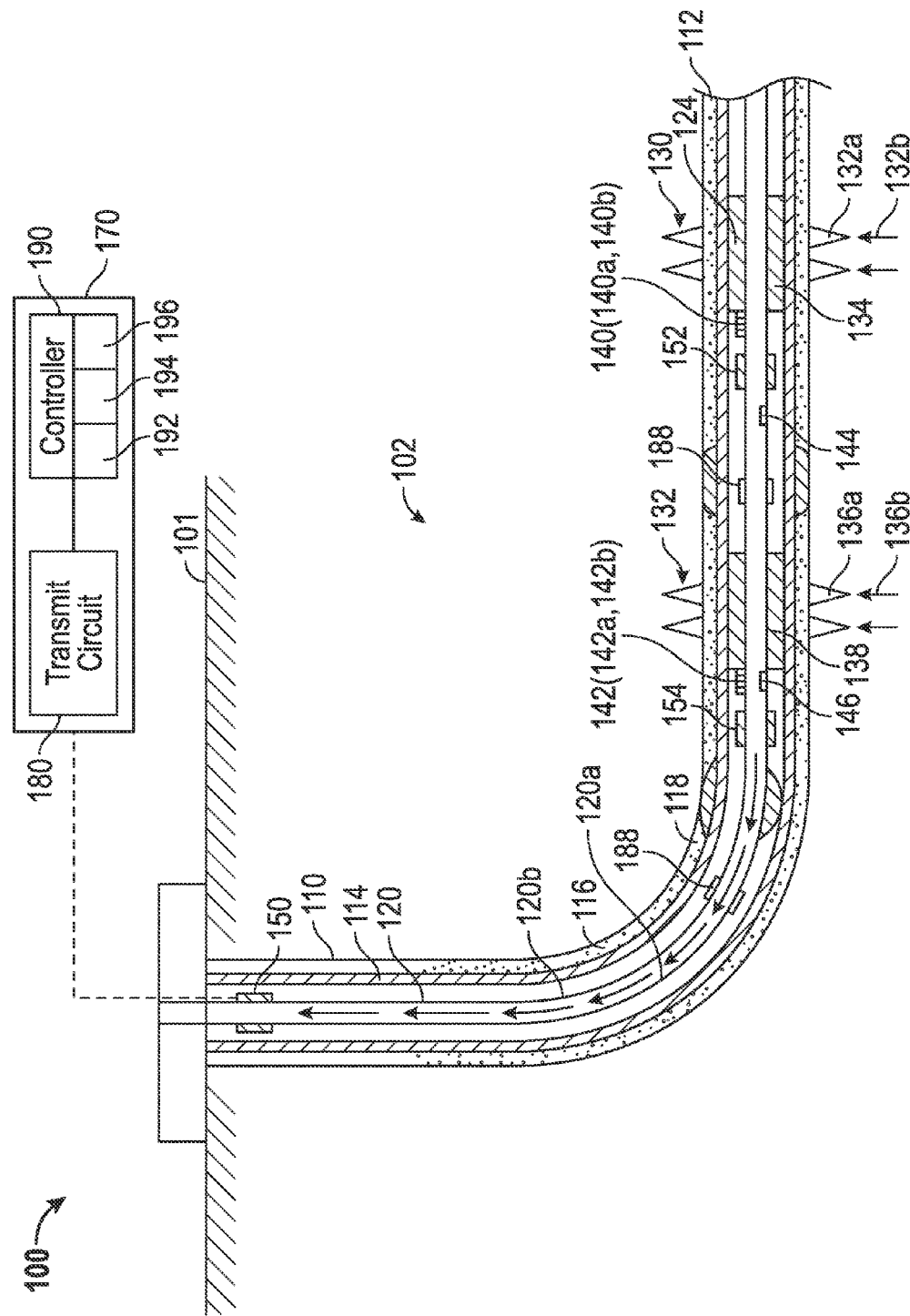
FIG. 1 is a line diagram of an exemplary production well showing two production zones and an EM wave transmitter on a production tubing proximate an end near the surface and a separate EM receiver and a control circuit for operating spaced apart downhole devices.
Figure 1A:
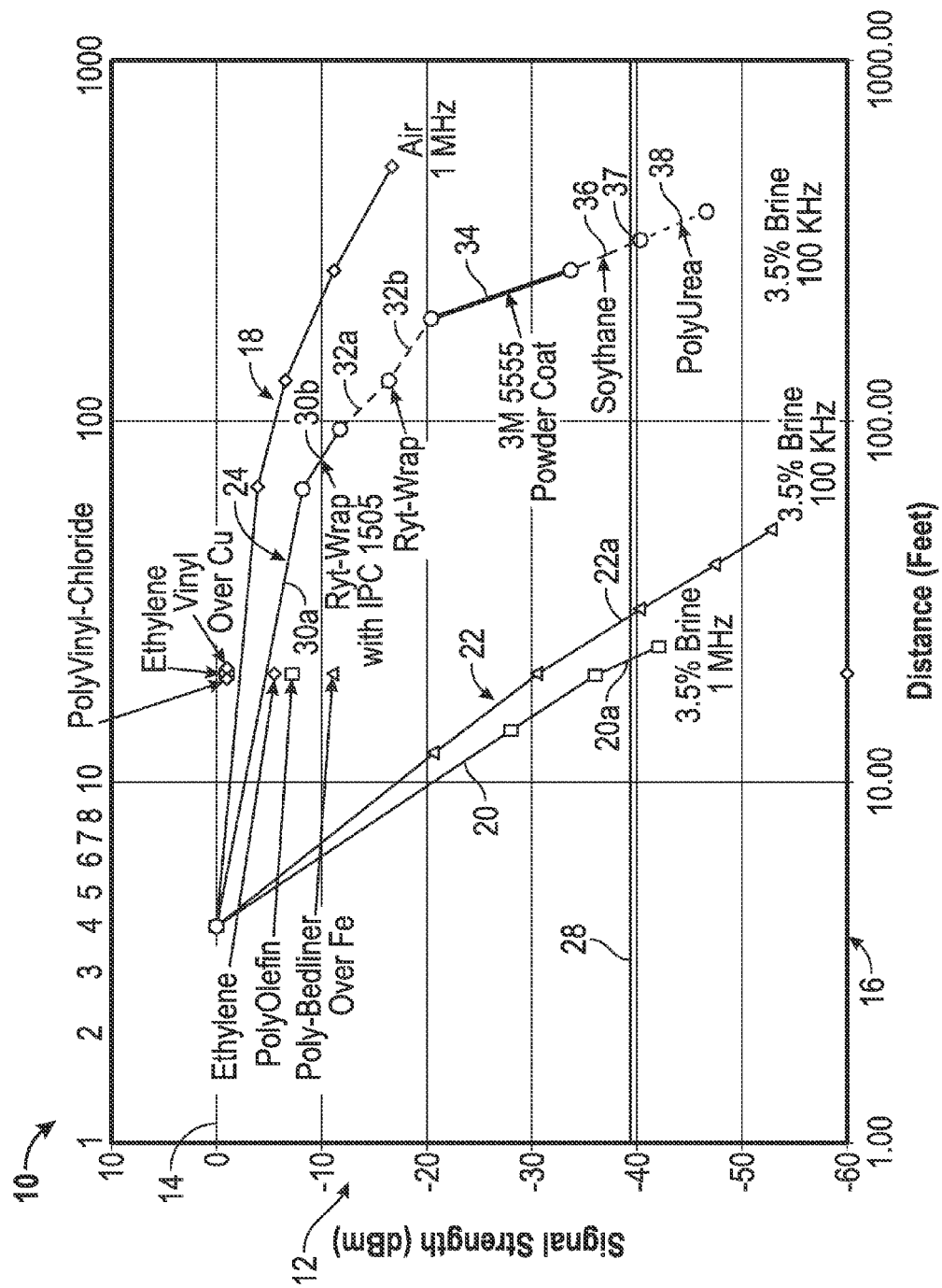
FIG. 1A is a graph comparing comparison of electromagnetic signal attenuation in air and in a metallic pipe that contains brine (salt water) for different types coatings on the tubular.

FIG. 1A is a graph 10 comparing electromagnetic wave attenuation in air and in a metallic pipe (tubular) that contains brine (salt water) for different types coatings on the tubular. The signal strength or attenuation is shown along the vertical axis 12 starting with zero attenuation in decibels at the point of transmission 14 of the electromagnetic waves to a receiver, while the distance of travel of the electromagnetic waves in the tubular is shown along the horizontal axis 16. The horizontal axis 16 values are on a log scale. Line 28 represents 40 decibel attenuation and is used herein as a reference. The pipe utilized was made by connecting 30 foot pipe sections at their threaded ends. An electromagnetic transducer was placed around the outside of the pipe to induce electromagnetic waves on the outside of the pipe at selected power and frequencies as described herein. Line 18 represents the signal strength or conversely attenuation of the electromagnetic waves induced on the outside of the pipe in air at 3 mw and 1 MHz frequency. Line 20 shows the signal strength at the receiver with the pipe filled with 3.5% salt water (brine) for electromagnetic waves induced at 3 mw and 1 MHz frequency. Line 18 shows an attenuation of about 8 decibels over a 500 foot pipe section in air, while line 20 shows attenuation of 40 decibels at point 20a over about 22 feet of the same pipe filled with 3.5% brine. Line 22 shows attenuation along the pipe filled with 3.5% brine for electromagnetic waves induced on the outside of the pipe at 3 mw power and 100 K Hz frequency. Line 22 shows attenuation of 40 decibels over a 33 foot pipe distance, a relatively modest improvement over the signals induced at 1.5 M Hz frequency in the same pipe. Comparison of lines 18 and 20 or 22 shows extensive attenuation in metallic pipes when such pipes contain brine, which is common with pipes installed in wellbores for the production of hydrocarbons.

Still referring to FIG. 1A, line 24 shows attenuation in a pipe having different types of coating on the pipe sections connected in series. The results shown along line 24 are with a transmitter on the outside of the pipe inducing electromagnetic waves at 3 mw power and 100 K Hz frequency with the pipe filled with 3.5% brine, with the EM waves traveling along the outside surface of the pipe. Lines 30a and 30b represent signals strength for approximately 200 feet of pipe made by connecting two 30 foot pipe sections at their threaded ends. The pipe was coated along the outside diameter and the inside diameter of the pipe sections with a commercially available material sold under the trade name "Ryt-Wrap" powdered material with IPC 1505. Sections 32a and 32b (approximately 200 feet made by joining two 30 foot pipe sections) were coated only on the outside surface with "Ryt-Wrap" powder material. Section 34, also made by connecting two 30 foot pipe sections, was coated only on the outside with commercially available material sold under the trade name "3M 5555" powder material. Section 36, made by connecting two 30 foot pipe sections, and was coated only on the outside of the pipe with commercially available material sold under trade name Soythane, while the last section 38 was coated with a PolyUria material. The combination of these coatings along line 24 shows 40 decibel attenuation at point 37 over a length of about 300 feet compared to line 22 that shows the same attenuation over about 24 feet. In general, for a transmitter on the outside of a pipe also coated the outside shows significant attenuation reduction in brine. Additionally coating the same pipe on the inside shows a relatively small improvement. The inverse of this also is true. In general, therefore, coating a brine-filled pipe on the surface along which EM waves travel showed substantially reduced attenuation compared to an uncoated pipe. Brine was used as it is typically present in wellbores. The experimental results depicted in FIG. 1A show that it would be desirable to coat conductive tubulars utilized in wellbore for transmitting EM waves through between two locations with an electrically insulating material. Powdered epoxies were determined to be acceptable materials for coating the tubulars to reduce attenuation of EM waves traveling along metallic pipes.

Figure 1B:
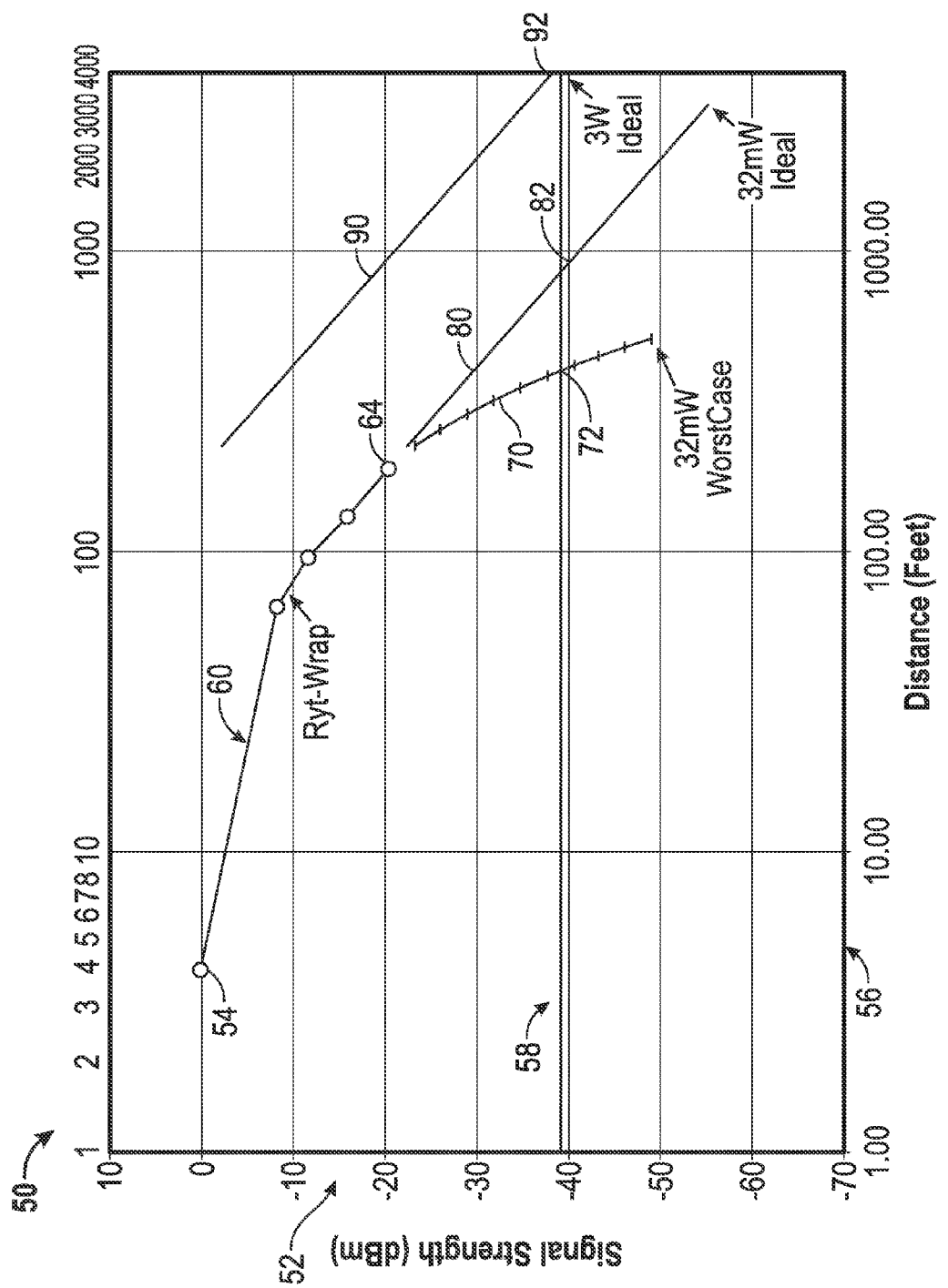
FIG. 1B is a graph showing attenuation of electromagnetic signals transmitted along a surface of the tubular for signals having different power and frequency.

FIG. 1B is a graph 50 showing attenuation of EM waves resulting from an exemplary wave attenuation model based on some of the experimental EM wave attenuation results shown in FIG. 1. The pipe for modeling purposes is a jointed steel pipe commonly utilized as casing in the oil industry, wherein 30 foot pipe sections are connected at threaded ends thereof to form the desired length of the pipe. For modeling purposes, the pipe is assumed to be coated on the outside with 15 mm thick Ryt-Wrap and filled with 3.5% brine. In one model, the EM transmitter is assumed placed on the outside of the pipe that induces EM waves at 32 mw power and 100 K Hz frequency and in another model at 3 watt power and 100 K Hz. In each case, the EM waves are assumed to travel along the outer surface of the pipe. The signal strength or attenuation in decibels along the pipe is shown along the vertical axis 52, starting at zero attenuation at the point of transmission 54. The distance of travel of the EM waves in the pipe is shown on a log scale along the horizontal axis 56. The base or reference attenuation of 40 decibels is shown by line 58. Line or curve 60 shows actual attenuation in the pipe. Point 64 at the end of line 60 shows attenuation of about 20 decibels at pipe length of about 200 feet. Line 70 shows modeling attenuation results for EM waves induced on the outside of the pipe at 32 mw power and 100 K Hz frequency in a worst case scenario while line 80 shows the ideal case. Point or location 72 on line 70 shows 40 decibel attenuation at about 300 in the worst case scenario, compared to 200 feet at point 37 in FIG. 1A. In the ideal case of line 80, the 40 decibel attenuation occurs at about 900 feet, as shown by point 82 on line 80. Thus, EM waves transmitted at 32 mw compared to waves transmitted at 3 mw show about 33% improvement for the worst case scenario and 4.5 times in the ideal case. However, when EM waves are transmitted at 3 watt power and 1 MHz frequency, the 40 decibel attenuation occurs at about 4000 feet, as shown by point 92 on line 90 compared to 900 feet for the ideal scenario with 32 mw EM waves at 100 K Hz frequency. Use of repeaters along the pipe can extend EM signal transmission between to location with less than 40 decibel attenuation to any desired pipe length, such as pipes in extended reach wells, which can extend to more than 20,000 feet.

FIG. 1 show a line diagram of an exemplary production well 100 formed to flow fluids (oil and gas) from a formation 102 to the surface 101. The production well 100 includes well 110 formed in the formation 102 to a depth 112. Well 110 is lined with a casing 114, such as a steel tubing. The annulus 116 between the casing 114 and the well 110 is shown filled with cement 118. A production tubing 120 is placed inside the casing 114 to carry the formation fluids to the surface. In aspects, the tubing 120 is coated on the inside 120a and/or the outside 120b with an electrically insulating material of a selected thickness, such as a thickness of about 3 mm-15 mm or more. The exemplary production well system 100 is shown to include production zones 130 and 133. Perforations 130a in the casing 114 and the formation proximate the production zone 130 enable the formation fluid 132b to flow from the formation into casing 114. A flow control device 134 controllably allows the fluid 132b to flow into the production tubing 120. Similarly, perforations 136a in the casing 114 and the formation proximate the production zone 133 enable the formation fluid 136b to flow from the formation into the casing 114. A flow control device 138 controllably allows the fluid 136b to flow into the production tubing 120.

In the particular example of production well 100, the flow control device 134 may be operated by a control unit 140, while the flow control device 138 may be operated by a control unit 142, based on one or more downhole conditions and/or in response to a signal sent from the surface via a telemetry system described later. The downhole conditions may include pressure, fluid flow, and corrosion of downhole devices, water content or any other parameter. Sensors 144 may be provided signals to the control unit 140 relating to the selected downhole parameters for determining downhole conditions relating to production zone 130. Similarly sensors 146 may be provided for determining downhole conditions relating to production zone 133. The control unit 140 may further include a receiver circuit 140a that receives the signals from its corresponding receiver coil, processes such signals and a device or another control unit 140b that controls or operates a downhole device. Similarly, the control unit 142 may include a receiver circuit 142a and a device 142b.

To operate the downhole tools, in one aspect, an EM telemetry apparatus is provided to transmit signals from the surface to the downhole control units 140 and 142, which control units determine the commands or data sent from the surface and operate the downhole tools as described in more detail later. In one aspect, the telemetry system includes a transmitter 150 placed on the tubing 120 proximate an upper end of the tubing to induce EM signals in the tubing 120. In one configuration, the transmitter 150 includes a coil that may be placed on the outside and around the tubing 120 so that the EM waves or signals induced therein will travel along the outside surface of the tubing 120. A small gap between the tubing 120 and the transmitter coil may be provided. A control unit 170 at the surface may be used to provide electrical signals to the transmitter coil. The control unit 170, in one aspect, may include a transmit circuit 180 and a controller 190. The transmit circuit 180 may include an amplifier circuit that energizes the transmitter at a selected frequency. In one aspect, the transmitter 150 may transmit EM wave signals at frequencies within a range of frequencies, such as frequencies between 10 K Hz and 1.5 M Hz. The controller 190 may include a processor 192, such as a microprocessor, a memory unit 194, such as a solid state memory, and programs 196 for use by the processor 192 to control the operation of the transmit circuit 180 and the transmitter 150. In one aspect, the output impedance of the transmit circuit 180, the impedance of the transmitter coil 150 and that of the tubing 120 are substantially matched. In one aspect, the transmitter output impedance is approximately 50 ohms. In another aspect, the control unit 170 may also be used to receive and process EM signals sent from a downhole location, such as signals from the sensors 144. As explained in more detail below.

Still referring to FIG. 1, the well system 100 further includes at least one receiver on the tubing 120 at location inside the well and at a selected distance for the transmitter 150. In the well configuration of FIG. 1, two receivers are shown. The first receiver 152 is shown placed proximate the first downhole device 134 and the second receiver 154 is placed proximate the second downhole device 138. In one configuration, receivers 152 and 154 may be placed around the outside of the tubing 120. In operation, the receivers 152 and 154 receive EM signals transmitted by the transmitter 150 and traveling along the tubing 120. Receiver circuit 140a processes signals received by receiver 152 and the control circuit 140b may further process such signals and control or operate the downhole device 134 in response to the instruction contained in the received signals and/or instructions programmed and stored in a memory associated with the control unit 140. Likewise, receiver circuit 142a may process the EM signals received by the receiver 154 and the device 142b may control or operate the downhole device 138 in response to such received signals. In one configuration, the transmitted signals are coded and are recognizable by the receiver circuits. In one configuration, both (or all in case of more than two receiver circuits) receivers receive all the transmitted signals but each receiver is configured to decode signals directed for it. In another configuration, a single receiver may be used for operating more than one downhole device. In such a case the receiver processes the received signals and directs different devices via a separate line or a common bus between the receiver and the corresponding downhole devices. In aspects, the transmitter may be configured to send the EM signals at a frequency that is based on the distance between the transmitter and a particular receiver. In aspects, such a frequency may provide peak EM signals for that particular distance. If the distance between the receivers downhole is great, then the transmitter may be configured to transmit at EM signals at different frequencies, one each corresponding to distance between the transmitter and each of the receivers. In another aspect one or more repeaters 188 may be placed between the transmitter and the first receiver and also between adjacent receives to receive and retransmit the received signals after conditioning such signals and at a power greater than that of the received signals. Repeaters may be placed at distances from the transmitter or other repeaters where the attenuation of the EM wave signals is less than or equal to a threshold value, such as 20 decibels, 30 decibels, 40 decibels, etc. In other aspects, transmitters may be placed downhole and EM signals may be sent to the surface receiver by the downhole control units 140 and 142. In aspects, the same unit may be used as both the transmitter and the receiver (also referred to in the industry as "transceiver"). In this manner, the telemetry system provides a two-way EM wireless communication between the surface and downhole locations via an electrically-conductive member, such as a jointed metallic tubular, that has been coated on the outside surface and/or the inside surface with a selected non-conductive or substantially non-conductive material of a selected thickness, such as 3-15 mm. In other aspects, to improve data transmission, the induced EM field may be modulated and a preamplifier, such as an −80 dBm preamplifier, may be utilized to shift automatic gain control to a desired or selected target range based on a predicted attenuation along the pipe in the wellbore. Additionally, a phase shift keying demodulation may be utilized to enhance data transmission to, for example, 200 Kbits/second from commonly used 20 Kbits/second. Low pass filters and error correction techniques may also be utilized to improve sensitivity of data transmission.

Figure 2:
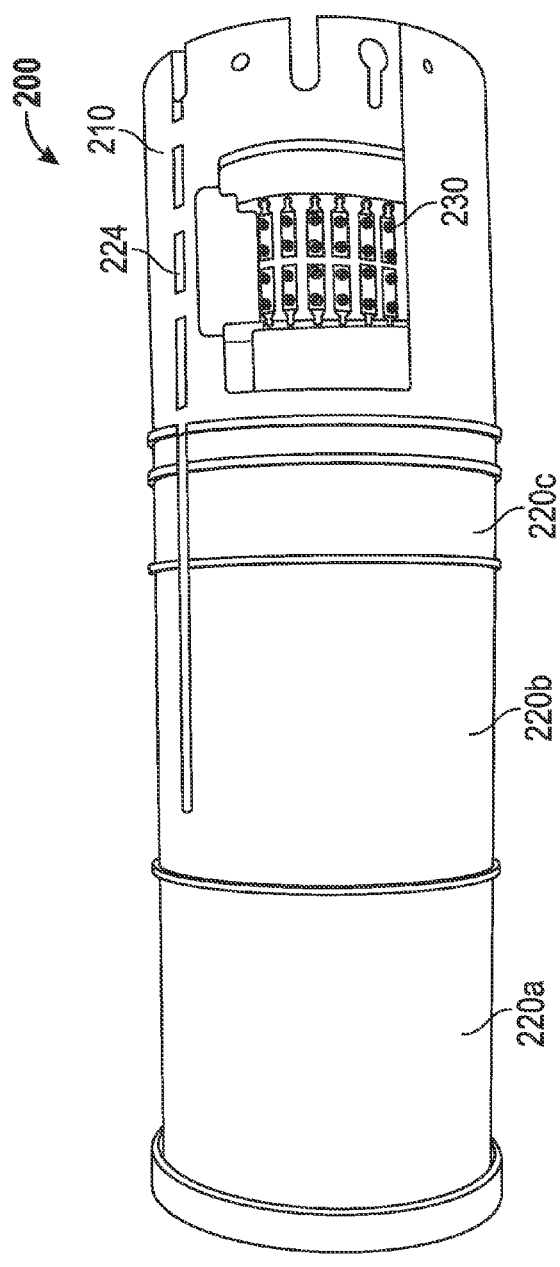
FIG. 2 shows a transmitter/receiver (transceiver) assembly made according to one embodiment of the disclosure.

FIG. 2 shows an exemplary transceiver 200 made according to one embodiment of the disclosure. In general, the transceiver 200 includes a bobbin 210 that has one or more coils, such as coils 220a, 220b and 220c wound around an outside surface of the bobbin 210. Each such coil includes a number of turns depending upon the signals to be transmitted and/or received. Also, the transceiver that is used as a transmitter may have different number of turns compared to the transceiver used as a receiver. In general, the receiver has a larger number of turns because the strength of the signal at the receiver is substantially less than the strength of the transmitted signal. The wire turns may be in one or more layers. In aspects, the transceiver 200 may include provisions for terminating coil leads 224, such as one or more terminal tabs 230. The bobbin 210 may be made from any suitable non-magnetic material, including, but not limited to, a composite material, such as material commercially known as Teflon. Teflon has desirable electrical insulation properties, high operating temperature, such as present downhole, mechanical strength and machinability.

Figure 3:
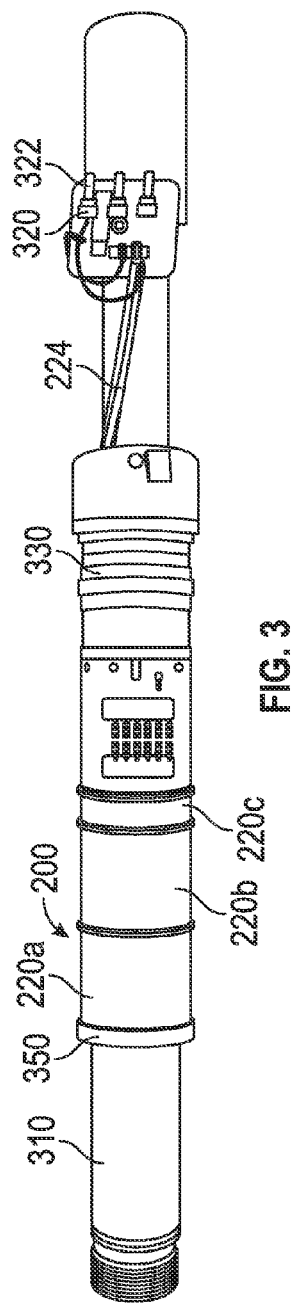
FIG. 3 shows an example of mounting the transceiver on the outside of an electrically-conductive member, such as a tubular in a wellbore.

FIG. 3 shows an example of mounting the transceiver 200 on an outside of an electrically-conductive member, such as a metallic tubular or pipe 310. The transceiver 200, in one configuration, may be placed around the tubular 310 with a gap 350 between the tubular 310 and the inner surface (see element 430a, FIG. 4) of the transceiver 200. A support member 330 may be utilized to mount the transceiver 200 on the tubular 310. Lines 224 may be used to connect the coils 220-220c to a connector or connection panel 320 that further connects the coils to a controller or control circuit, such as a transmit circuit 180 or a receiver circuit 142a shown in FIG. 1.

Figure 4:
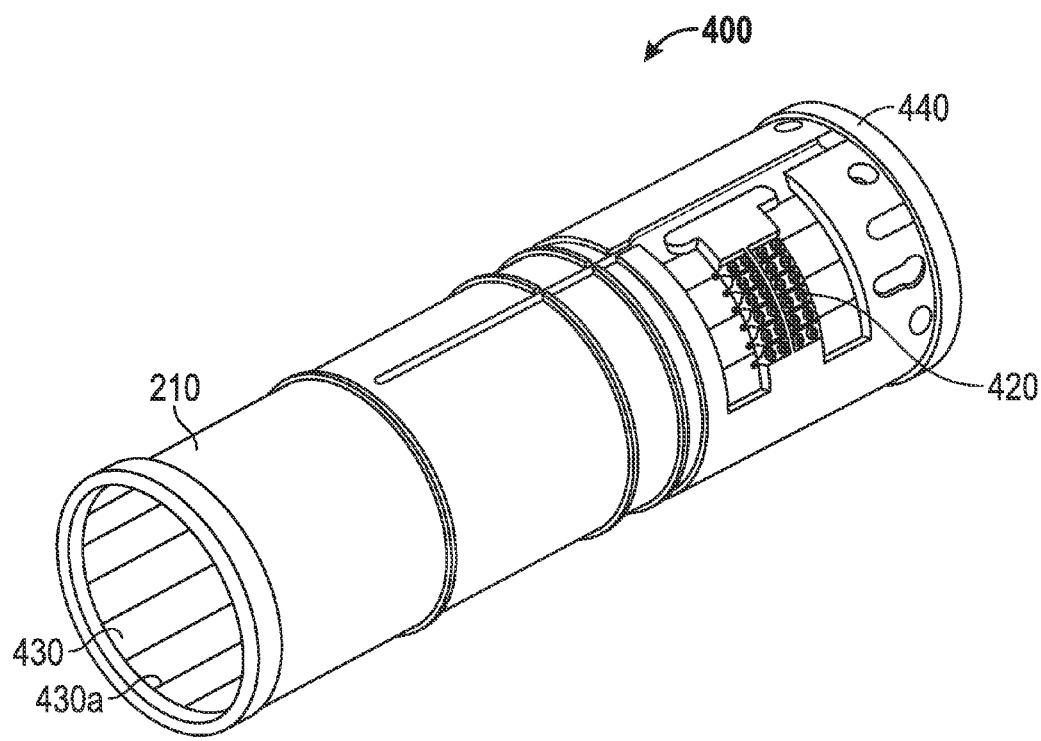
FIG. 4 shows a subassembly of the transceiver of FIG. 3 that includes a bobbin placed around the outside of a sleeve.

FIG. 4 shows a subassembly 400 of the transceiver of FIG. 2 that includes a bobbin 210 placed around a conductive sleeve 430 having an inner surface 430a according to one embodiment of the disclosure. In one aspect, the bobbin 210 is securely placed around the sleeve 410. A hub 440, such as a hub made from a metallic material, may be used to provide mechanical support to the transceiver 200. In one aspect, an annular space 350 (not visible) is provided between the inner surface 430a of the transceiver 200 and the tubular 310. In other aspects, a non-magnetic (for example. diamagnetic aluminum) mandrel on the inner diameter of the annular space 350 may be provided to allow pipe flow through transceiver 200. Also, structural support across transceiver 200 may be provided to support tubular 310 string load with a ferromagnetic material to allow propagation of the EM signals in the tubular 310.

Figure 5:
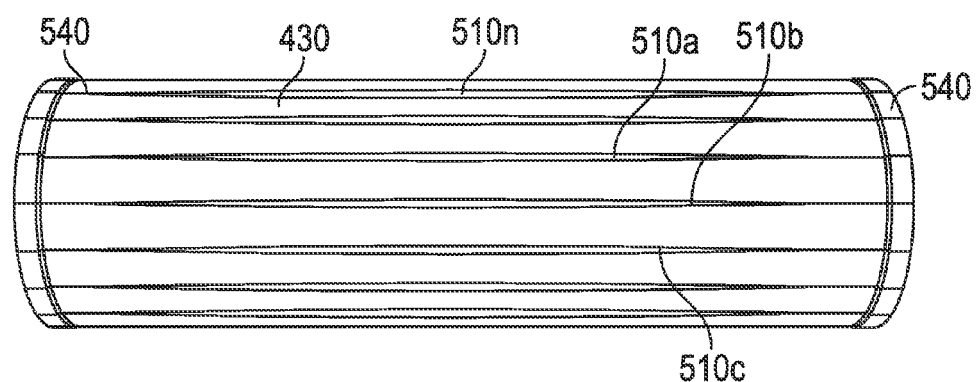
FIG. 5 shows an exemplary sleeve with longitudinal slots for use in the transceiver shown in FIG. 2.

FIG. 5 shows an exemplary sleeve 430. In aspects, the sleeve 430 includes one or more longitudinal or substantially longitudinal slots or slits 510a, 510b through 510n. The slits in the sleeve 430 are provided because eddy currents generated in the sleeve can substantially reduce the strength of the generated EM signal. To contain the electromagnetic signals associated with this transceiver 200, the sleeve is made from a material that exhibits favorable magnetic properties. An example of such a material is M-19 silicon steel. Also, M-19 silicon steel does not have an oriented grain structure and thus does not require a careful orientation of the M-19 silicon steel during fabrication. However, stress can be introduced in the sleeve material during forming of the slits, which can reduce the magnetic properties of the material due to the plastic deformation of the material. One method of reducing the stress on the sleeve 430 is to incorporate relatively narrow or thin laser cut slits. Any other method may also be utilized. In one aspect, the slits 510a-510n may be approximately 0.010" wide at approximately 0.5" spacing around the sleeve. In another aspect, the sleeve 430 is placed beneath the transmitter coil locations in a manner so as to constrain the plastic deformation of the sleeve material (bend lines that coincide with the slits). In another aspect, the sleeve 430 may include hemmed end 540 that constrains the sleeve 430 in the assembly between the bobbin 210 and the hub adapter 440 shown in FIG. 4. An interference fit between the internal diameter of the sleeve 430 at the hemmed end 540 and the hub adapter 440 creates a conductive interface between the sleeve and the hub for reliable transmission of the electromagnetic signals to the outside of the tubular 310, FIG. 3.

In one configuration, the disclosed apparatus and methods provide wireless signal (or data) transmission via a wellbore pipe, wherein an electromagnetic waves propagate on or along the outside surface and the length of the pipe. The transmitter coils induce an electromagnetic field in the surface (such as the first millimeter or so) of the pipe material. Below the coil, the pipe material is sub-divided so as to not provide a complete conductive path around its circumference (slots). The generated electromagnetic waves travel along the length of the pipe from the transmitter to the receiver. The electromagnetic waves couple to the receiver coil, and into a low noise amplifier and a demodulator. The transmitted EM field may be modulated using a frequency shift keying (FSK), wherein a binary shift in frequency domain encodes either the data as a zero or one, and thus sending telemetry information from the transmitter to the receiver over the length of the pipe.

Several factors present in the wellbore environment attenuate the EM field strength between the transmitter and receiver, such as metallic packers, metallic centralizers, physical contact between casing and tubing, salt water, etc. However, the most significant aspects include the attenuation with the distance between the transmitter and receiver and the standing waves that result from such distance. Therefore, it is advantageous to transmit the EM signals at a frequency that provides peak or near peak values. In one aspect, an optimal frequency at which EM signals are transmitted may be determined by Helmholtz's wave equation for cylindrical coordinates. The Helmholtz's equation describes standing waves along the length of a cylindrical transmission line and provides that for a given length of pipe, there is one and only one frequency for peak transmission. Higher harmonics of such a frequency have lower signal strength, and frequencies in between these harmonics have much lower signal strength. Thus, in one aspect, the transmission frequency in the disclosed system is determined or selected based on the length or spacing of the tubular between the transmitter and the receiver. In wellbore applications, such distance is typically known or during well completion or may be determined after completion of the wellbore. The Helmholtz equation or any other suitable method may be used to determine the transmission frequency. Other methods for determining frequency based on the distance may include simulation or other equations and algorithms.

The foregoing disclosure is directed to the certain exemplary embodiments and methods. Various modifications will be apparent to those skilled in the art. It is intended that all such modifications within the scope of the appended claims be embraced by the foregoing disclosure. Also, the abstract is provided to meet certain statutory requirements and is not to be used to limit the scope of the claims.

The invention claimed is:

1. A telemetry apparatus for use in a wellbore, comprising:
    an electrically-conductive member deployed in the wellbore, the electrically-conductive member having an inner surface and an outer surface, wherein at least one of the inner surface and the outer surface is coated with an electrically-insulating powdered epoxy coating to reduce an attenuation of electromagnetic waves traveling along the at least one of the inner surface and the outer surface of the electrically-conductive member;
    a transmitter placed at a first location of the electrically-conductive member that induces the electromagnetic waves into the electrically-conductive member, wherein the electromagnetic waves propagate along the at least one of the inner surface and the outer surface of the electrically-conductive member between the electrically-insulating powdered epoxy coating and the at least one of the inner surface and the outer surface of the electrically-conductive member; and
    a receiver placed at a second location spaced from the first location on the electrically-conductive member that detects the electromagnetic waves induced by the transmitter, wherein the transmitter induces the electromagnetic waves at a frequency determined based on a spacing between the first location of the transmitter and the second location of the receiver,
    wherein the transmitter generates electromagnetic waves at frequencies within a range of frequencies between 50 KHz and 1.5 MHz and the receiver sweeps such frequencies and selects one or more operating frequencies therefrom.

2. The apparatus of claim 1, wherein the coated surface has a coating of thickness greater than approximately 5 mm.

3. The apparatus of claim 1, wherein the insulating material is selected from a group consisting of: an epoxy compound, a polyethylene compound, a polyvinyl amide compound, polyvinyl sulfone, polytetrafluoroethylene; polyurethane; an acrylic polymer, phenolic; and a combination thereof.

4. The apparatus of claim 1 further comprising a transmitter circuit supplying electrical energy to the transmitter, wherein the impedance of the transmitter circuit substantially matches an impedance of the electrically-conductive member.

5. The apparatus of claim 1 further comprising a transmitter circuit coupled to the transmitter that causes the transmitter to transmit electromagnetic waves at a combination of a power and a frequency that enables the receiver to receive the transmitted signals with less than selected attenuation of the transmitted signals.

6. The apparatus of claim 1 further comprising one or more repeaters between the transmitter and receiver, wherein the each of the one or more repeaters receive electromagnetic signals with attenuation less than a threshold value and retransmit the received signals along the outside of the electrically-conductive member.

7. The apparatus of claim 1, wherein the gap exists between the transmitter and a first non-coated section of the electrically-conductive member and another gap exists between the receiver and a second non-coated section of the electrically-conductive member.

8. The apparatus of claim 1, wherein the transmitter comprises an electrically-conductive sleeve between the transmitter coil and the electrically conductive member, the electrically-conductive sleeve having a plurality of longitudinal slits configured to reduce effect of eddy currents in the transmitter.

9. The apparatus of claim 1 further comprising:
a downhole device; and
a receiver circuit that processes the electromagnetic waves detected by the receiver and controls an operation of the downhole device in response thereto.

10. The apparatus of claim 9, wherein the downhole device is selected from a group consisting of: a device in a production well; a device in a drilling assembly; a flow control device; a sensor; a directional drilling device; a resistivity tool, an acoustic tool; a magnetic resonance tool; a formation testing tool; a nuclear tool; and a sealing device.

11. A telemetry apparatus for use in a wellbore, comprising:
an electrically-conductive tubular coated on at least one of its inside surface and its outside surface with an electrically-insulating powdered epoxy coating to reduce an attenuation of electromagnetic waves traveling along the at least one of the inside surface and the outside surface of the electrically-conductive tubular;
a transmitter comprising:
a first electrically-conductive member having a first plurality of substantially longitudinal slits, and
a first coil wrapped around the first electrically-conductive member at a first location;
a receiver comprising a second electrically-conductive member having a second plurality of longitudinal slits and a second coil around the second electrically-conductive member, the receiver being disposed around the tubular at a second distal location in the wellbore;
a transmitter circuit configured to cause the transmitter to induce electromagnetic wave signals into the tubular, wherein the electromagnetic wave signals propagate along at least one of the inside surface and the outside surface of the tubular between the electrically-insulating powdered epoxy coating and at least one of the inside surface and the outside surface of the tubular at a frequency selected based on the distance between the transmitter at the first location and the receiver at the second location; and
a receiver circuit configured to: receive electromagnetic signals responsive to the transmitted electromagnetic wave signals; process the received electromagnetic wave signals; and perform an operation in response to the processed signals,
wherein the transmitter generates electromagnetic waves at frequencies within a range of frequencies between 50 KHz and 1.5 MHz and the receiver sweeps such frequencies and selects one or more operating frequencies therefrom.

12. The apparatus of claim 11, wherein an impedance of the transmitter circuit substantially matches a combined impedance of the transmitter and the tubular, and an impedance of the receiver circuit substantially matches a combined impedance of the receiver and the tubular.

13. A method of transmitting data along an electrically-conductive member in a wellbore;
providing an electrically-conductive tubular in the wellbore, wherein the tubular is coated on at least one of an inner surface and an outer surface of the tubular with an electrically-insulating powdered epoxy coating to reduce an attenuation of electromagnetic waves traveling along the at least one of the inner surface and the outer surface of the electrically-conductive member;
transmitting electromagnetic wave signals representing data into the electrically-conductive tubular, wherein the electromagnetic wave signals propagate along at least one of the inner surface and the outer surface of the electrically-conductive tubular between the electrically-insulating powdered epoxy coating and the at least one of the inner surface and the outer surface of the tubular using a transmitter disposed at a first location on the tubular;
receiving the electromagnetic wave signals traveling along one the at least one of the inner surface and the outer surface of the tubular responsive to the transmitted electromagnetic wave signals using a receiver disposed on at a second distal location on the tubular, wherein the transmitter induces the electromagnetic waves at a frequency determined based on a spacing between the first location of the transmitter and the second location of the receiver and at frequencies within a range of frequencies between 50 KHz and 1.5 MHz, and the receiver sweeps the range of frequencies to select one or more operating frequencies therefrom; and
determining the data from the received electromagnetic wave signals.

14. The method of claim 13, wherein the coated surface has a coating of thickness greater than approximately 3 mm.

15. The method of claim 13, wherein transmitting electromagnetic waves comprises operating a transmitter circuit whose impedance substantially matches an impedance of the transmitter and the tubular.

16. The method of claim 13 further comprising receiving the transmitted waves at a repeater between the first location and the second location; modifying the received signals, and inducing the modified signals on one of the outer surface and inner surface of the tubular.

17. The method of claim 13 further comprising operating a device in the wellbore in response to the received data, wherein the device is selected from a group consisting of: a device in a production well; and a device in a drilling tool.

* * * * *